United States Patent [19]

Sezai

[11] Patent Number: 5,248,984
[45] Date of Patent: Sep. 28, 1993

[54] METHOD FOR PROCESSING AN ANTENNA PATTERN

[75] Inventor: Toshihiro Sezai, Tokyo, Japan

[73] Assignee: National Space Development Agency of Japan, Tokyo, Japan

[21] Appl. No.: 955,993

[22] Filed: Oct. 2, 1992

[30] Foreign Application Priority Data

Nov. 13, 1991 [JP] Japan ................................ 3-323952
Nov. 13, 1991 [JP] Japan ................................ 3-323953

[51] Int. Cl.$^5$ .............................................. G01S 5/02
[52] U.S. Cl. ................................... 342/427; 342/373; 342/149
[58] Field of Search ........................ 342/427, 373, 149

[56] References Cited

U.S. PATENT DOCUMENTS

| | | |
|---|---|---|
| 4,334,224 | 6/1982 | Gordon . |
| 4,564,935 | 1/1986 | Kaplan ................. 342/373 |
| 4,599,622 | 7/1986 | Haupt .................. 343/427 |
| 4,827,270 | 5/1989 | Udagawa et al. ...... 342/373 |
| 5,017,929 | 5/1991 | Tsuda ................. 342/427 |

FOREIGN PATENT DOCUMENTS 2315241 10/1974 Fed. Rep. of Germany .
WO91/01620 2/1991 PCT Int'l Appl. .

*Primary Examiner*—Theodore M. Blum
*Attorney, Agent, or Firm*—Armstrong, Westerman, Hattori, McLeland & Naughton

[57] ABSTRACT

A method for processing an antenna pattern in which a first antenna system is placed to correspond with a first direction in relation to the beam width to be compressed, a second antenna system of the monopulse power feed system is placed to correspond with a second direction lying at a right angle to the first direction, in which an antenna beam of the first and the second antenna systems is scanned in a direction other than the first and the second directions. A sum signal $\Sigma 1$, a difference signal $\Delta 1$ and sum signal $\Sigma 2$, difference signal $\neq 2$ are formed in hybrid circuits, and an output signal two-dimensionally compressed are obtained as a result of adding a signal resulting from the subtraction of the difference signal $\Delta 1$ from the sum signal $\Sigma 1$ to a signal resulting from the subtraction of the difference signal $\Delta 2$ from the sum signal $\Sigma 2$ in a signal processing section. Moreover, the signal processing section outputs the value obtained by adding a signal resulting from the difference signal $\Delta 1$ being subtracted from the sum signal $\Sigma 1$ to a signal resulting from the difference signal $\Delta 2$ being subtracted from the sum signal $\Sigma 2$ when the sum signal $\Sigma 1$ is larger than the difference signal $\Delta 1$ and when the sum signal $\Sigma 2$ is larger than the difference signal $\Delta 2$, otherwise outputs zero, so that an output signal which beam is compressed two-dimensionally and a side lobe is reduced two-dimensionally can be obtained.

3 Claims, 10 Drawing Sheets

METHOD FOR PROCESSING AN ANTENNA PATTERN

BACKGROUND OF THE INVENTION

1. Field of the Invention

The present invention relates to a processing method for antenna patterns in an antenna apparatus of monopulse power feed system, more particularly to a two-dimensional beam compression processing method which compresses antenna patterns two-dimensionally, and relates to an antenna pattern processing method which can compress the beam width of the antenna patterns two-dimensionally and reduces side lobes.

2. Description of the Related Art

Generally, the beam width and side lobes act as indices to represent the efficiency of antenna patterns, and the smaller the beam width is or the smaller the side lobe is, the better the performance of the antenna for transmitting as well as for receiving.

However, there is an opposed relationship between the beam width and the side lobe, and the beam width is inversely to the size (length) of antenna. That is, when the size of the antenna is constant, the side lobe will be made larger if the beam width is made smaller, and the beam width will be made larger if the side lobe is made smaller. When the size of antenna may be varied, the antenna may be made larger if the beam width is made smaller, and the beam width will be made larger if the antenna is made smaller.

Therefore, for example, in a radar antenna, in the relationship between beam width side lobe, resolution capability may become worse, identification capability for objects may decline and many objects might be mistaken for one object, whenever the beam width is widened and the side lobe is necessarily made smaller. Conversely, when the beam width is made smaller, the side lobe is made large, therefore, when there is an object in the direction of the side lobe, a wrong judgement may be made that there is an object in the direction for observation. Moreover, in the relationship of the beam width and the antenna size when the beam width id reduced by half and the identification capability is doubled, the size of antenna must necessarily be doubled. If the size of the antenna is doubled not only the occupied region of the antenna is made larger, but the weight of antenna also increases as well as the antenna support structure. Conversely, when the size of the antenna is reduced by half, the beam width is doubled, and the identification capability is reduced by half.

Thus, it is impossible to optimize both the beam width and side lobe characteristics so the beam width and the side lobe are compromised to a certain degree, considering a distribution for minimizing the beam width under a condition of a certain side lobe, or for minimizing the side lobe under that of a certain beam width, such as a Chebyshev distribution. The beam width and the size of antenna having an opposite nature as described, most practical antennas have restrictions such as the region occupied by antennas, the beam width is compromised to a certain degree in the actual situation.

In order to solve these problems conventionally, a beam compression method is well-known for narrowing the beam width by subtracting a difference signal pattern of each received signal from a sum signal pattern of each received signal from the same two antennas of a monopulse power feed system. FIG. 1 shows an antenna apparatus for performing such a beam compression. Antennas 101 of monopulse power feed system with length a and distance d between their respective centers, a hybrid circuit (HYB) 102 for forming a sum signal $\Sigma$ and a difference signal $\Delta$ for each received signal in the two antennas 101, 101, detection circuits 103 for detecting the sum signal $\Sigma$ and the difference signal $\Delta$, and subtracting circuit 104 for outputting an antenna output signal after subtracting the difference signal $\Delta$ from the sum signal $\Sigma$.

FIG. 2 and FIG. 3 illustrate the result of a simulation when horn antennas with each of their lengths set about 25.7 times as long as the received wavelength and the distance between their centers set the same value as length a are used as the antennas 101, and the figures illustrate field patterns (FIG. 2) and power patterns (FIG. 3) normalized on the basis of the value in the direction where the angle is at zero degree, while the aperture surface distribution of the antennas is assumed to be a uniform distribution. In these figures for patterns, broken lines show the sum signal $\Sigma$ and solid lines show output patterns; from these patterns, it is understood that beam compression is performed.

According to the conventional beam compression method as described above, the sum signal patterns of the original antenna patterns are given the beam compression, along with however, large side lobes generated in output patterns, as shown in FIG. 2 and FIG. 3. That is, in a near point where the value of the sum signal $\Sigma$ takes zero for the first time, the value of the difference signal $\Delta$ shows a maximum value, then the value subtracted the value of the difference signal $\Delta$ from that of the sum signal $\Sigma$ is negative as shown in FIG. 2, but the value b is much larger than the size c of the side lobe of the sum signal pattern. Therefore, in some conventional beam compression methods, a side lobe is enlarged in the point where the difference signal $\Delta$ is larger than the sum signal $\Sigma$, consequently, although the beam compression can be made, the side lobe will be larger than desired.

Moreover, in the conventional method for performing beam compression, only one antenna system comprises with the same two antennas of the monopulse power feed system, and the method is only allowed beam width to be compressed one-dimensionally, and its identification capability is not sufficient. That is, for example, if a main beam pattern when beam compression is not performed is a pattern 201 as shown in FIG. 4A, it is impossible to identify the objects a, b, c, d and e, in this case. If this pattern is one-dimensionally compressed toward the direction X its main beam pattern 202 is given as shown in FIG. 4B, and the identification capability is improved compared to the case which beam compression is not performed. However, the identification capability is not sufficient, because it is still impossible to identify the objects a, c and e.

SUMMARY OF THE INVENTION

The present invention solves the problems in the conventional beam compression methods as described above, and the first object is to provide a two-dimensional beam compression method for improving the identification capability by performing beam compression two dimensionally.

The second object of the present invention is to provide a processing method of an antenna; pattern for improving the identification capability by performing beam compression two-dimensionally, and allowing side lobes to be reduced two-dimensionally.

In order to achieve the first object, in the present invention, an antenna device consists of a first antenna system comprising the two same antennas of the monopulse power feed system placed in order to correspond with a first direction of the direction of the beam width to be compressed, and a second antenna system comprising the two same antennas of the monopulse power feed system placed in order to correspond with a second direction lying at a right angle to said first direction while its center axis corresponds with a center axis of the first antenna system, the antenna beam of the antenna device is scanned toward directions other than said first and second directions, addition of the signal resulting from a difference signal of the received signals from the two antennas in the first antenna system being subtracted from a sum signal of the received signals from the two antennas in the first antenna system to the signal resulting from a difference signal of the received signals from the two antennas in the second antenna system being subtracted from a sum signal of the received signals from the two antennas in the second antenna system to produce output signal from the antenna device.

In the two-dimensional beam compression method of the present invention an output signal which the beam width of the first direction is compressed can be obtained, by subtracting the difference signals of the receiving signals of the two antennas in the first antenna system from the sum of the same received signals. Moreover, an output signal in which the beam width of the second direction is compressed can be obtained, by subtracting the difference signals of the received signals of the two antennas in the second antenna system from the of sum the same received signals. Consequently, an antenna output signal performing twodimensional beam compression in the first direction and the second direction can be obtained, by adding these output signals.

In order to achieve the second object of the present invention, a processing method for an antenna pattern comprises an antenna device consisting of a first antenna system including the same two antennas of the monopulse power feed system oriented to correspond with a first direction of the beam width to be compressed, and a second antenna system including the same two antennas of the monopulse power feed system oriented to correspond with a second direction lying at a right angle to said first direction while having its center axis corresponding with a center axis of the first antenna system, scanning the antenna beam of the antenna device toward directions other than said first and second directions, adding the signal resulting from a difference signal of the receive signals from the two antennas in the first antenna system being subtracted from a sum signal of the received signals from the two antennas in the first antenna system to the signal resulting from a difference signal of the received signals from the two antennas in the second antenna system being subtracted from a sum signal of the received signals from the two antennas in the second antenna system, and giving the added signal as an output signal from the antenna device, wherein said output signal is zero when the value of the sum signal of said first antenna system is equal to or smaller than the value of the difference signal of said first antenna system, or when the value of the sum signal of said second antenna system is equal to or smaller than the value of the difference signal of said second antenna system.

In the processing method of antenna patterns of the present invention, an output signal which the beam width in the first direction is compressed can be obtained by subtracting the difference signal of the received signals from the two antennas in the first antenna system from the sum signal of the two antennas in the first antenna system Moreover, an output signal in which the beam width in the second direction is compressed can be obtained/ by subtracting the difference signal of the received signals from the two antennas in the second antenna system from the sum signal of the two antennas in the second antenna system. Then, an antenna output signal performing a two-dimensional beam compression in the first direction and the second direction can be obtained by adding these output signals. Furthermore, zero is outputted when the values of each sum signal of the first and second antenna system is equal to or smaller than the values of each difference signal. Therefore, the side lobes in the first and the second directions are reduced. That is, as a side lobe grows larger in the portion where the value of the difference signal is larger the value of the sum signal, a side lobe will get smaller if the output in that portion is zero. Therefore, while the beam can be compressed two-dimensionally, a side lobe can also be reduced two-dimensionally.

DETAILED DESCRIPTION OF THE PREFERRED EMBODIMENTS

Figure 5:
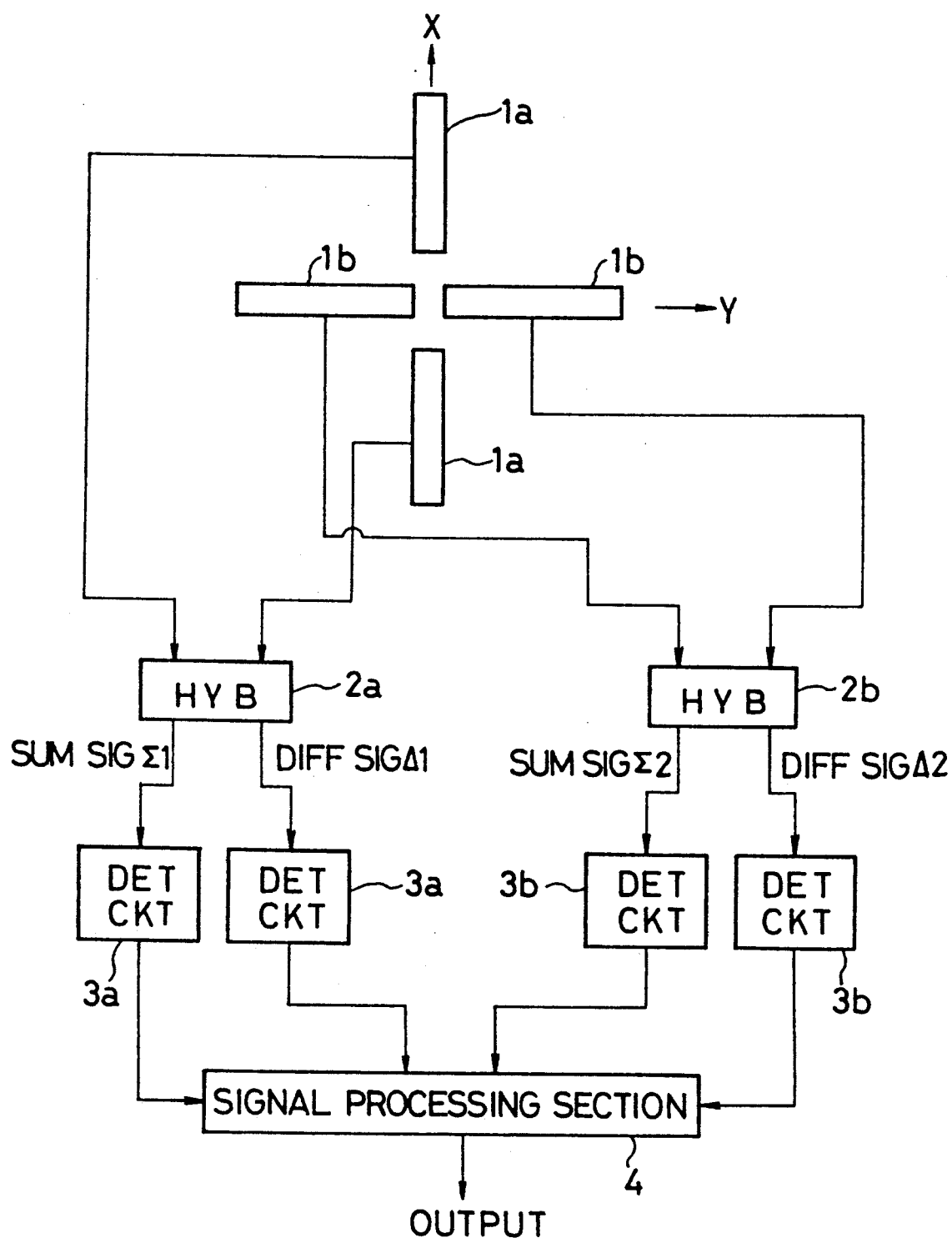
FIG. 5 is a schematic block diagram of an antenna apparatus for describing a first embodiment for a processing method of antenna patterns relating to the present invention.

A first embodiment of the present invention will be described hereinunder. FIG. 5 illustrates a schematic block diagram of the antenna apparatus used in the first embodiment of the processing method of the antenna pattern relating to the present invention. This embodiment relates to a two-dimensional beam compression method of an antenna pattern to achieve the first object of the present invention. In the figure, numerals 1a, 1a denote two receiving antennas of the monopulse power feed system with the same structure, such as horn antennas and array antennas, placed toward a first direction (direction X), and constituting a first antenna system. Numerals 1b, 1b also denote two receiving antennas of the monopulse power feed system with the same structure, such as horn antennas and array antennas, placed toward a second direction (direction Y) lying at right angles to the first direction, and constituting a second antenna system. Numerals 2a, 2b denote hybrid circuits(HYB); hybrid circuit 2a forms a sum signal $\Sigma 1$ and a difference signal $\Delta 1$ of each received signal from the two antennas 1a, 1a of the first antenna system, and; hybrid circuit 2b forms a sum signal $\rho 2$ and a difference signal $\Delta 2$ of each received signal from the two antennas 1b, 1b of the second antenna system. Numerals 3a, 3a, 3b and 3b denote detection circuits, numeral 4 denotes a signal processing section which outputs a signal after processing of the addition of a signal resulting from the difference signal $\Delta 1$ being subtracted from the sum signal $\Sigma 1$ and a signal resulting from the difference signal $\Delta 2$ being subtracted from the sum signal $\Sigma 2$, which signals are demodulated in each detection circuit.

In the apparatus above, if, during scanning of the antenna beam radio waves arrive in directions other than the direction X and the direction Y, hybrid circuit 2a inputs receiving signals from the first antenna system and outputs a sum signal $\Sigma 1$ corresponding with the sum signal pattern and a difference signal $\Delta 1$ corresponding with the difference signal pattern. Moreover, hybrid circuit 2b inputs receiving signals from the second antenna system and outputs a sum signal $\Sigma 2$ corresponding with the sum signal pattern and a difference signal $\Delta 2$ corresponding with the difference signal pattern. After these signals are demodulated in the detection circuit 3a, 3a, 3b, 3b respectively, an output corresponding to a pattern in which beam width is compressed two-dimensionally can be obtained, by performing the signal processing of the addition of a signal resulting from the difference signal $\Delta 1$ being subtracted from the sum signal $\Sigma 1$ and a signal resulting from the difference signal $\Delta 2$ being subtracted from the sum signal $\Sigma 2$ in the signal processing section 4.

Figure 6A:
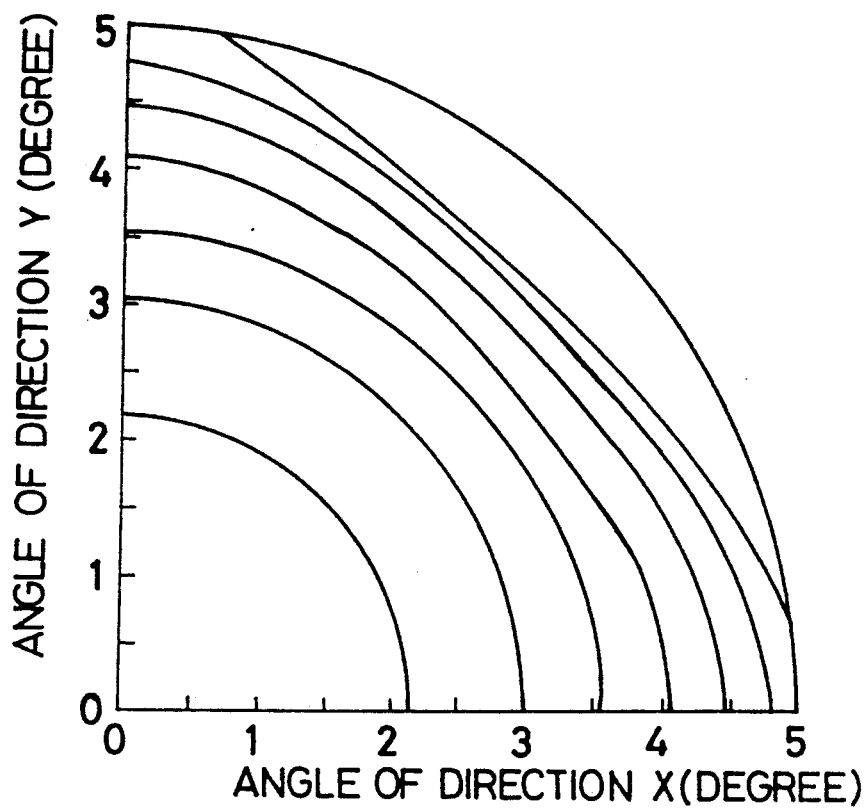
FIGS. 6A and 6B illustrate resultant patterns obtained in an antenna apparatus shown in FIG. 5.
Figure 6B:
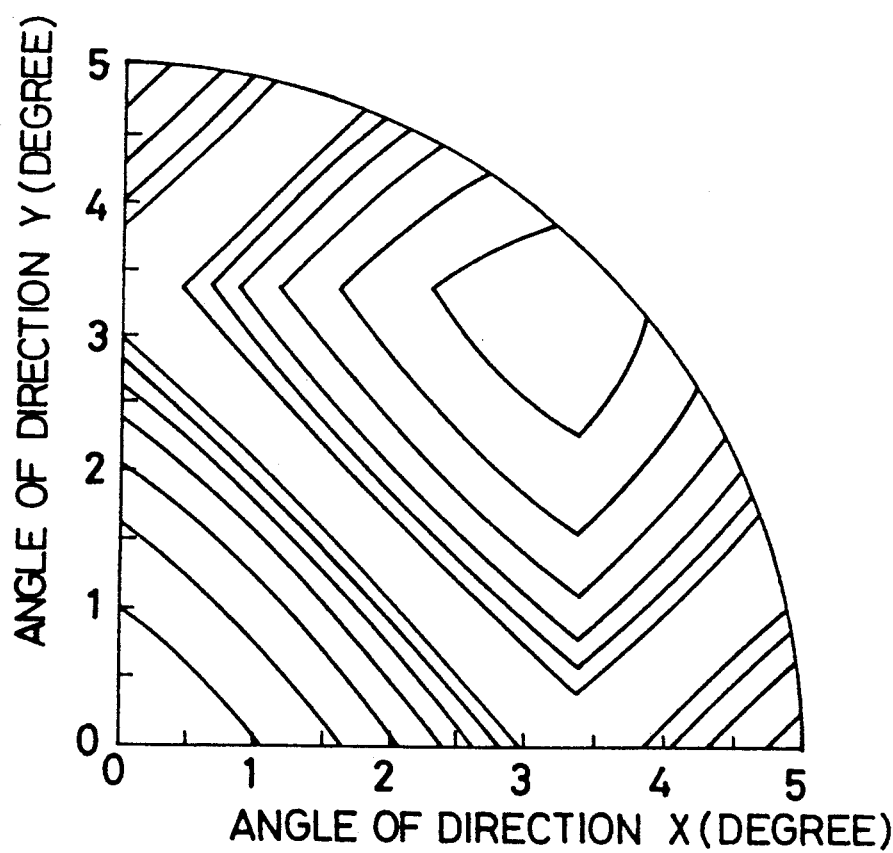

FIGS. 6A and 6B illustrate results of the simulation using square-shaped horn antennas having a length of one side which is 6 times as long as the received wavelength, acting as antennas in the first and the second antenna systems, and using the antenna systems comprising the first and the second antennas set the distance between their centers about 8.48 times as long as the received wavelength. In this case, every aperture distribution of any antenna is assumed to be uniform distribution. FIG. 6A illustrates a pattern adding the received signals of the four square-shaped horn antennas comprising each antenna systems, and FIG. 6B illustrates a pattern in which two-dimensional beam compression is performed. These patterns are shown as contour drawings, and the values of $-3$, $-6$, $-9$, $-12$, $-15$, $-18$ and $-21$ in dB are associated with each respective contour starting from the origin. It be found that the beam width toward the X direction Y and the direction is reduced approximately by half two-dimensionally, judging from these patterns.

Figure 1:
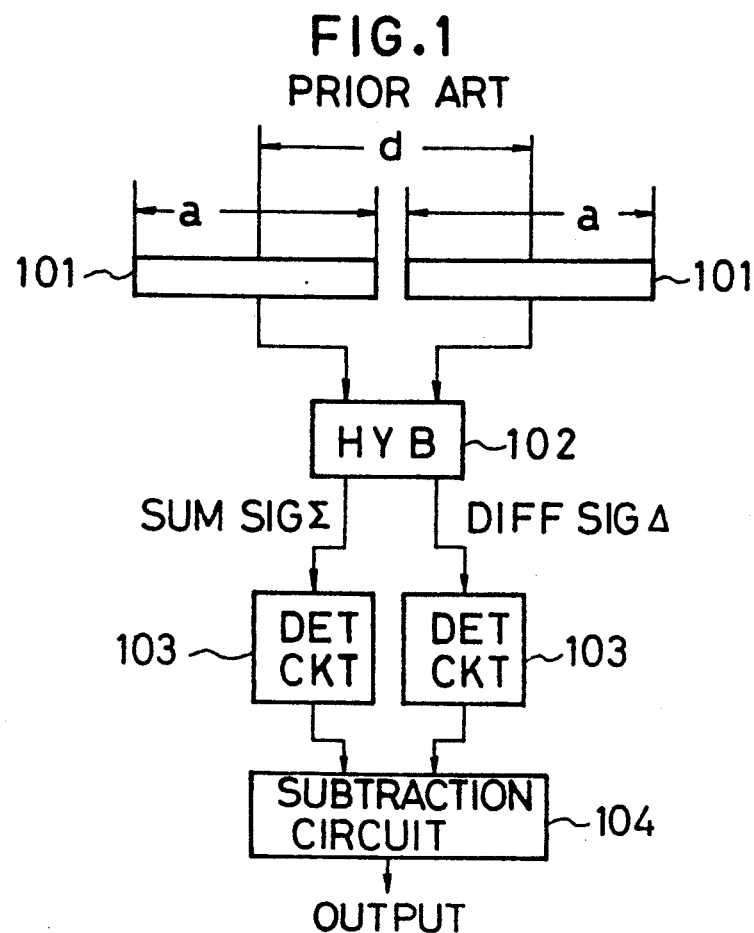
FIG. 1 is a schematic illustration of a conventional antenna apparatus of the monopulse power feed system for performing one-dimensional beam compression.
Figure 2:
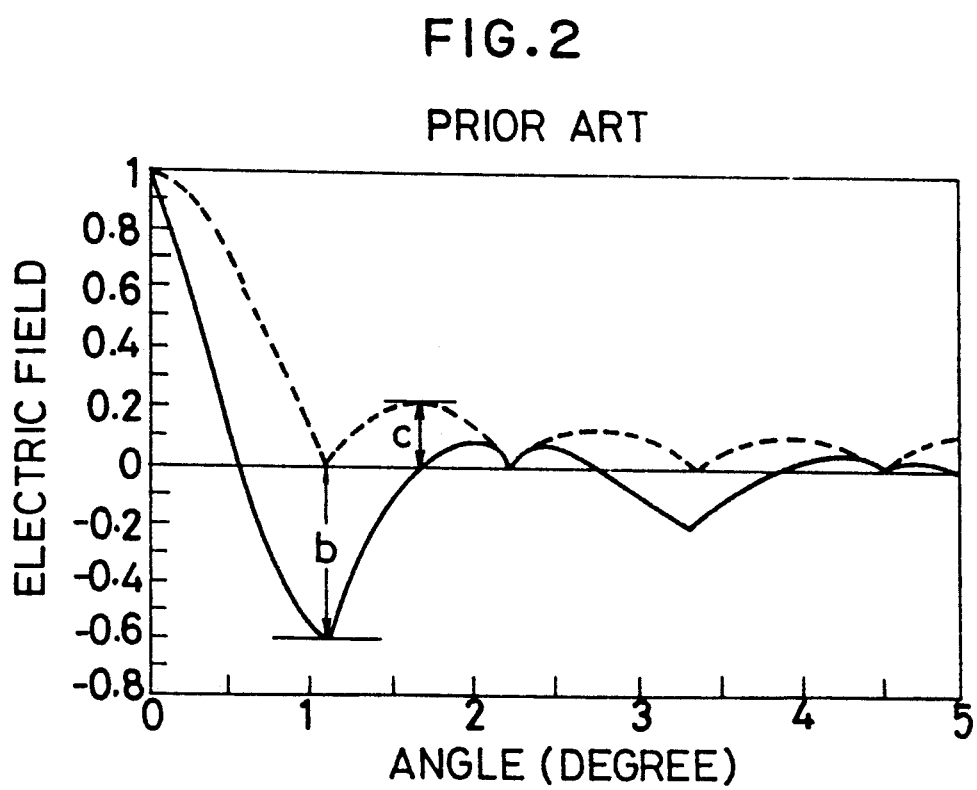
FIG. 2 illustrates field patterns of output signals from the antenna apparatus shown in FIG. 1.
Figure 3:
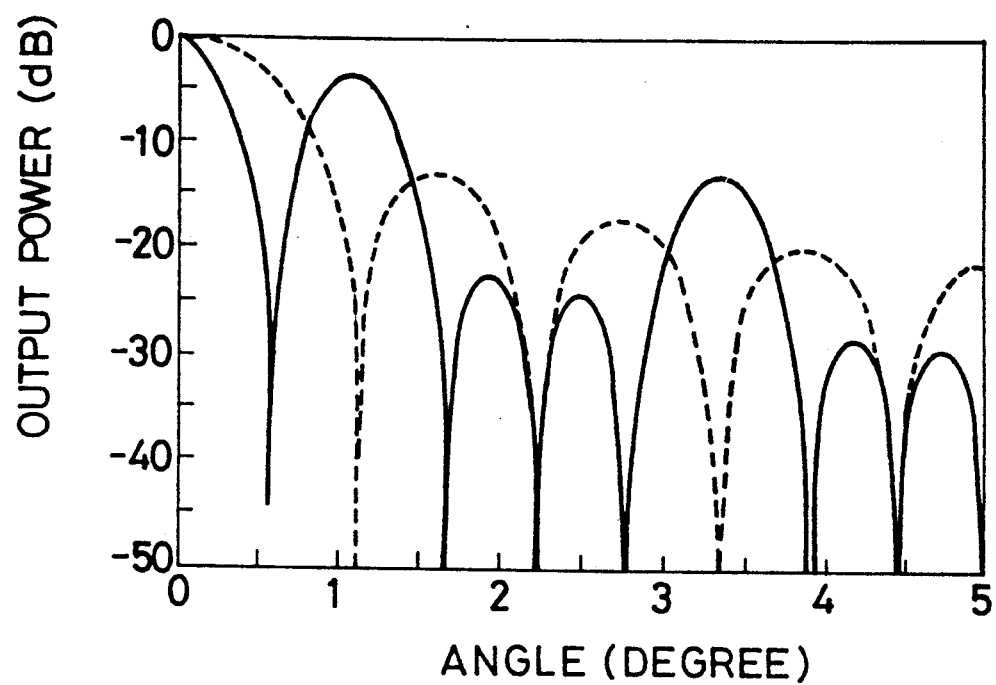
FIG. 3 illustrates power patterns of output signals from the antenna apparatus shown in FIG. 1.
Figure 4A:
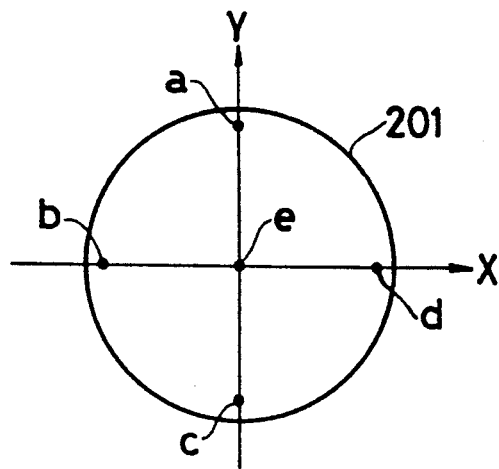
FIGS. 4A and 4B are explanatory drawings for explaining the identification-capability of the main beam.
Figure 4B:
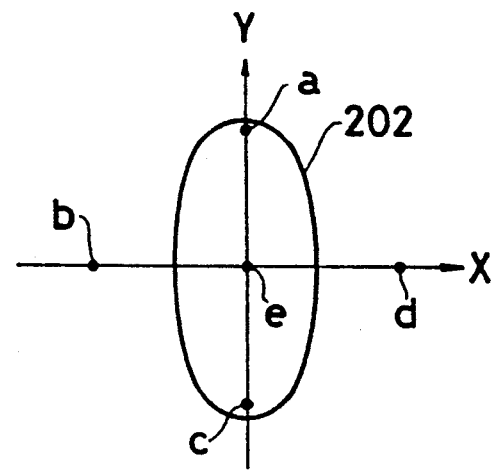
Figure 7:
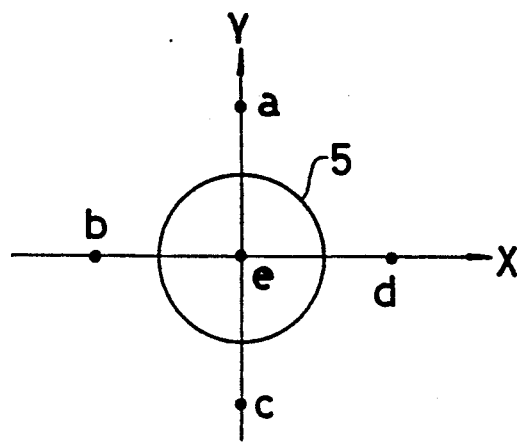
FIG. 7 illustrates an explanatory drawing of a two-dimensional compression main beam pattern for explaining the improvement of the identification capability by two-dimensional beam compression.

FIG. 7 further illustrates how the identification capability is improved when beam compression is performed two-dimensionally, with the same typical drawing as FIG. 4A and FIG. 4B. That is, if beam compression is performed two-dimensionally, the main beam is given as pattern 5, and it is understood that it becomes possible to identify each object of a, b, c, d and e and the identification capability is improved better.

Figure 8:
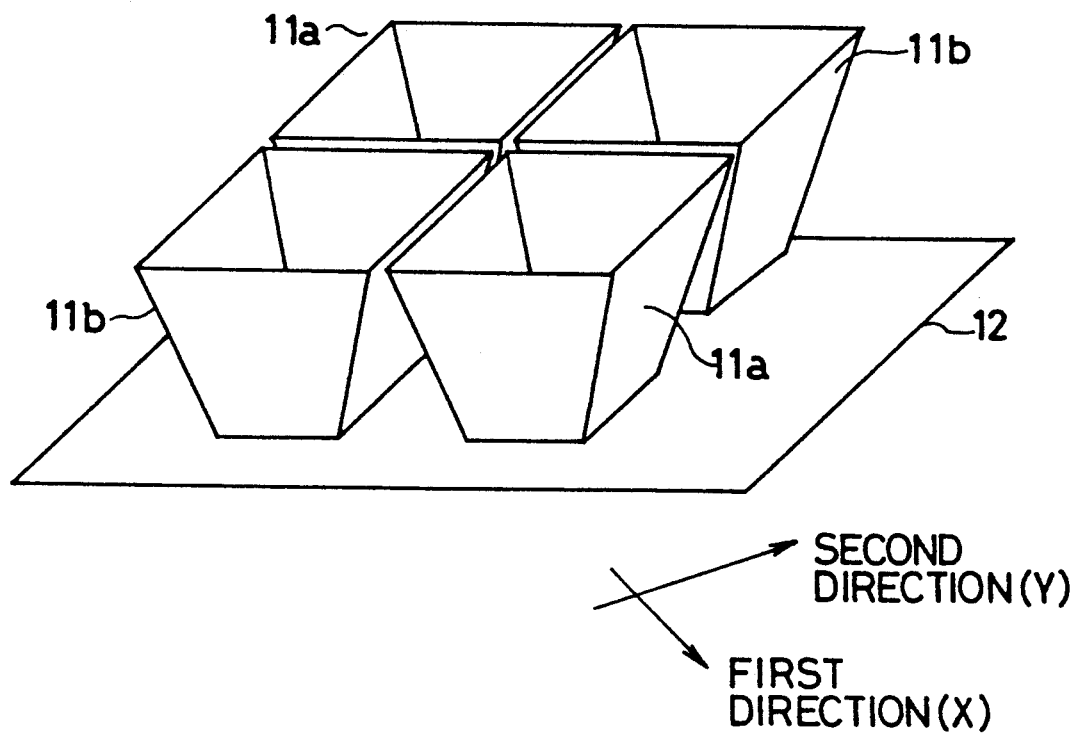
FIG. 8 is a drawing of one embodiment of each antenna system of the antenna apparatus used in the performance of the embodiment of the present invention.

FIG. 8 is an example of the above-described embodiment of each antenna system of the antenna apparatus. In this embodiment, the first and the second antenna system include rectangle-shaped horn antennas 11a, 11a, 11b, 11b. The antennas 11a, 11a of the first antenna system are placed toward the first direction (direction X), and the antennas 11b, 11b of the second antenna system are placed toward the second direction (direction Y) while the center axis of the antennas corresponds with the center axis of the first antenna system. Further, numeral 12 denotes a supporting plate of the antenna systems.

Figure 9:
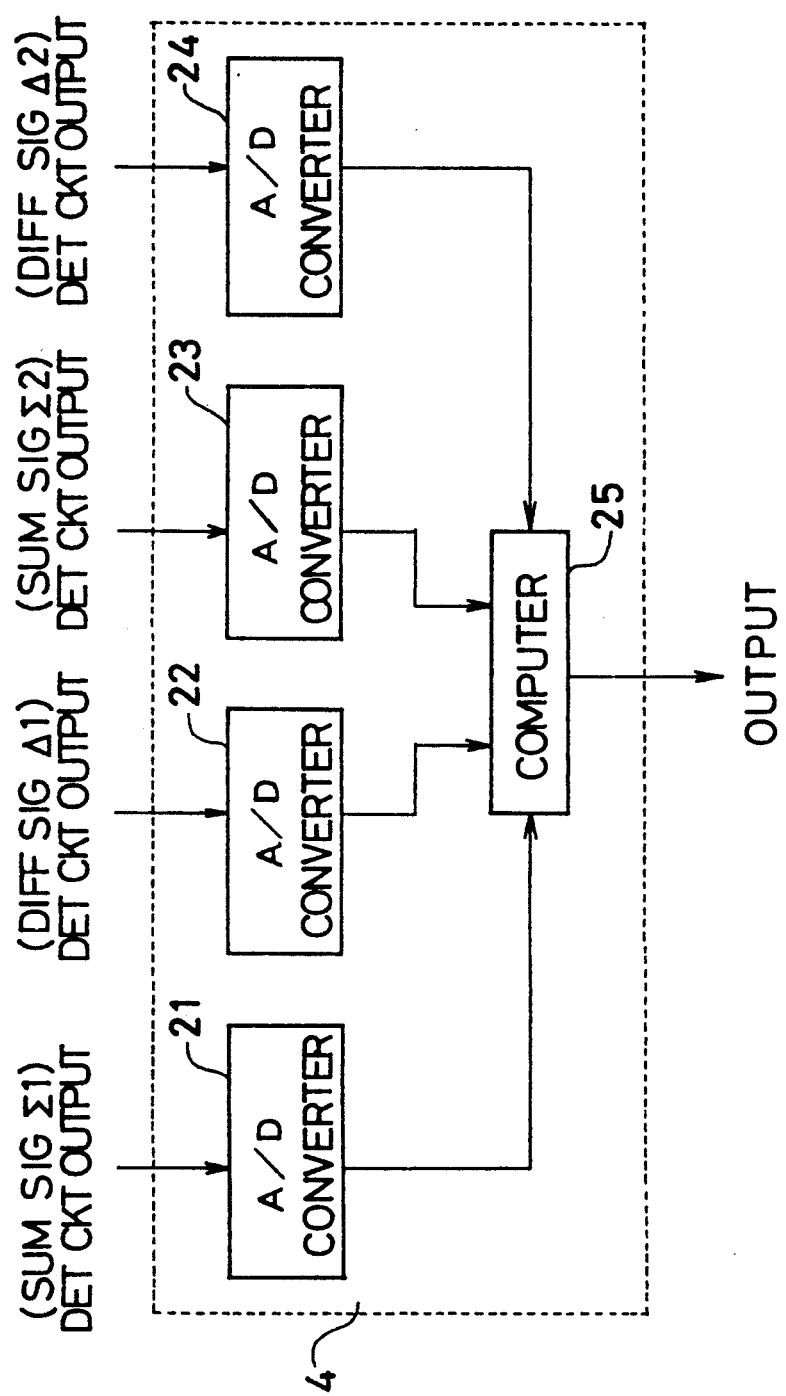
FIG. 9 is a circuit diagram of one embodiment of a signal processing section.

Generally, a differential amplifiers and an adding circuit can be used as a signal processing section when the processing is performed in an analog manner. Moreover, it is possible to use existing techniques such as means for subtracting and adding with a computer after converting the outputs from the detection circuits into digital signals with A/D converters in the case of digital processing. One of the embodiment is shown in FIG. 9. In the figure, numerals 21, 22, 23 and 24 are A/D converters for converting the analog sum signal $\Sigma 1$, the difference signal $\Delta 1$, the sum signal $\Sigma 2$ and the difference signal $\Delta 2$ demodulated by the detection circuits into digital signals respectively. Numeral numerals 25 is a computer which performs the processing of adding a signal resulting from the digital difference signal $\Delta 1$ being subtracted from the sum signal $\Sigma 1$ to a signal resulting from the difference signal $\Delta 2$ being subtracted from the the sum signal $\Sigma 2$.

As described hereinbefore, according to this embodiment, the first antenna system placed toward the first direction (direction X) and the second antenna system placed toward the second direction (direction Y) are used, and the system outputs the signal adding a signal resulting from the difference signal of the first antenna system which can be obtained by scanning toward directions other than the first and the second directions being subtracted from the sum signal of the first antenna system to a signal resulting from the difference signal of the second antenna system being subtracted from the sum signal. Therefore beam width can be compressed two-dimensionally, and it is possible to improve the identification capability.

Figure 10:
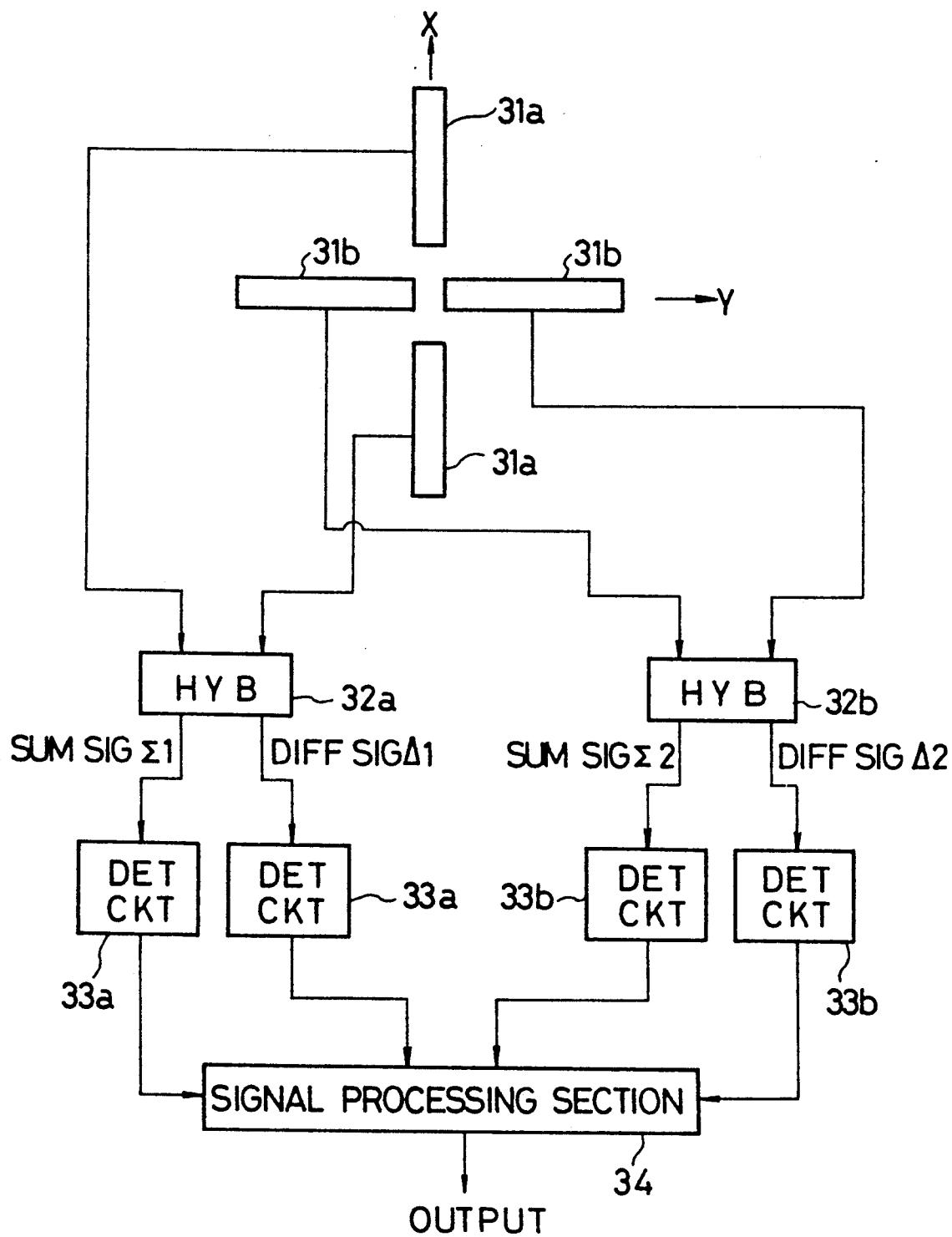
FIG. 10 is a schematic block diagram of an antenna apparatus for describing a second embodiment of the present invention.

The second embodiment of the present invention will be described hereinunder. This embodiment relates to the methods for two-dimensional beam compression and two-dimensional side lobe reduction in order to achieve the second object of the present invention. FIG. 10 is a schematic block diagram of an antenna apparatus for describing the second embodiment of the present invention. In the figure, numerals 31a, 31a denote two receiving antennas of the monopulse power feed system each having the same structure, such as horn antennas and array antennas, placed toward a first direction (direction X), and comprising a first antenna system. Numerals 31b, 31b also denote two receiving antennas of the monopulse power feed system with the same structure, such as horn antennas and array antennas, placed toward a second direction (direction Y) lying at a right angle to the first direction, and comprising a second antenna system. Numerals 32a, 32b denote hybrid circuits (HYB). Hybrid circuit 32a forms a sum signal Σ1 and a difference signal Δ1 of each received signal from the two antennas 31a, 31a of the first antenna system, and hybrid circuit 32b forms a sum signal Σ2 and a difference signal Δ2 of each received signal from the two antennas 31b, 31b of the second antenna system. Numerals 33a, 33a, 33b and 33b denote detection circuits. Numeral 34 denotes a signal processing section which outputs a signal after processing of the addition of a signal resulting from the difference signal Δbeing subtracted from the sum signal Σ1 and a signal resulting from the difference signal Δ2 being subtracted from the sum signal Σ2, which signals are demodulated in each detection circuit which outputs zero when the sum signal Σ1 is equal to or smaller than the difference signal Δ1 or when the sum signal Σ2 is equal to or smaller than the difference signal Δ2.

In the apparatus described above, if a beam of the antenna scans radio waves in directions other than the direction X and the direction Y, hybrid circuit 32a inputs receiving signals from the first antenna system outputs a sum signal Σ1 corresponding with the sum signal pattern and a difference signal Δ1 corresponding with the difference signal pattern. Moreover, hybrid circuit 32b inputs receiving signals from the second antenna system and outputs a sum signal Σ2 corresponding with the sum signal pattern and a difference signal Δ2 corresponding with the difference signal pattern. After these signals are demodulated in the detection circuit 33a, 33a, 33b, 33b respectively, the signal processing of the addition of a signal resulting from the difference signal Δ1 being subtracted from the sum signal Σ1 and a signal resulting from the difference signal Δ2 being subtracted from the sum signal Σ2 is performed in the signal processing section 34, which outputs zero when the sum signal Σ1 is equal to or smaller than the difference signal Δ1 or when the sum signal Σ2 is equal to or smaller than the difference signal Δ2. Thererfore, the output corresponding with a pattern is which beam width is compressed two-dimensionally, and which a side lobe is reduced two-dimensionally, can be obtained.

Figure 11A:
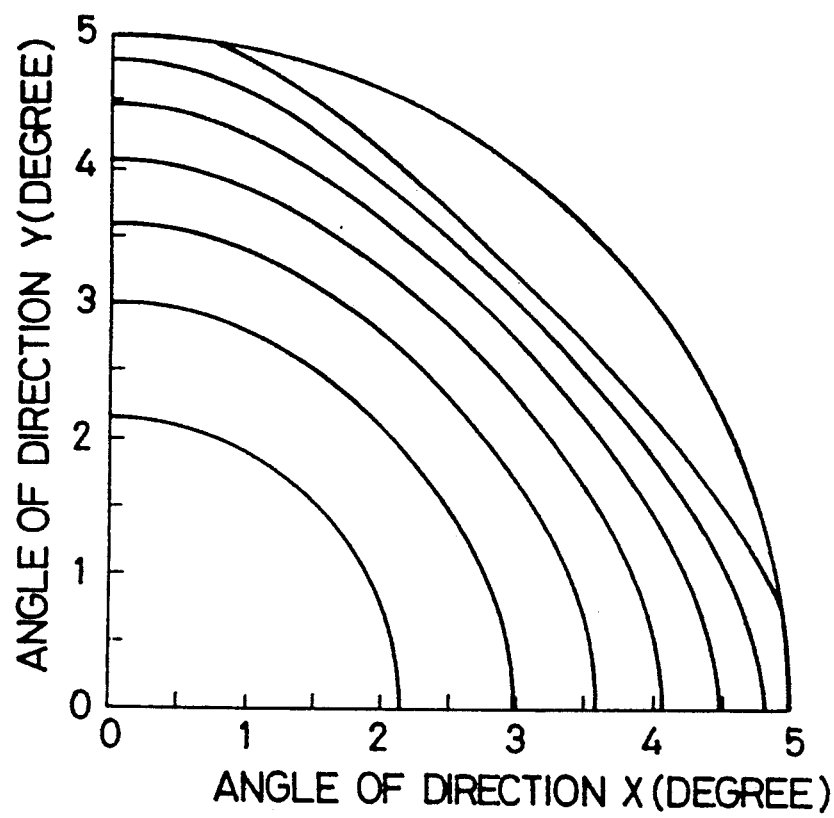
FIGS. 11A and 11B illustrate resultant patterns obtained from the antenna apparatus shown in FIG. 10.
Figure 11B:
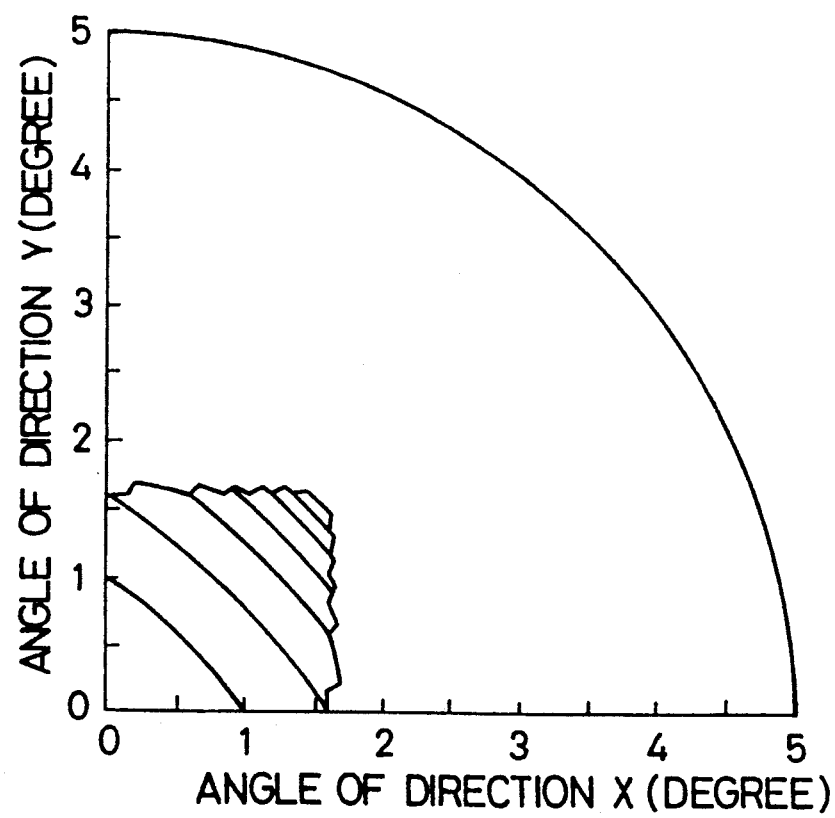

FIG. 11A and 11B illustrate results of simulation using square-shaped horn antennas having a length 6 times as long as the received wavelength, which comprise the first and the second antenna systems and using the antenna systems comprising the first and the second antennas set the distance between their centers about 8.48 times as long as the received wavelength, as the first embodiment. In this case, every aperture distribution of any antenna is assumed to be a uniform distribution. FIG. 11A illustrates a pattern adding the received signals of the four square-shaped horn antennas comprising each antenna systems, and FIG. 11B illustrates a pattern in which two-dimensional beam compression and two-dimensional side lobe reduction are performed. These patterns are shown as contour drawings, and the values of −3, −6, −9, −12, −15, −18 and −21 in dB are associated with each respective contour starting from the origin. It can be found that the beam width toward the X direction and the Y direction is reduced approximately by half two-dimensionally and a side lobe is reduced two-dimensionally, judging from these patterns.

Figure 12:
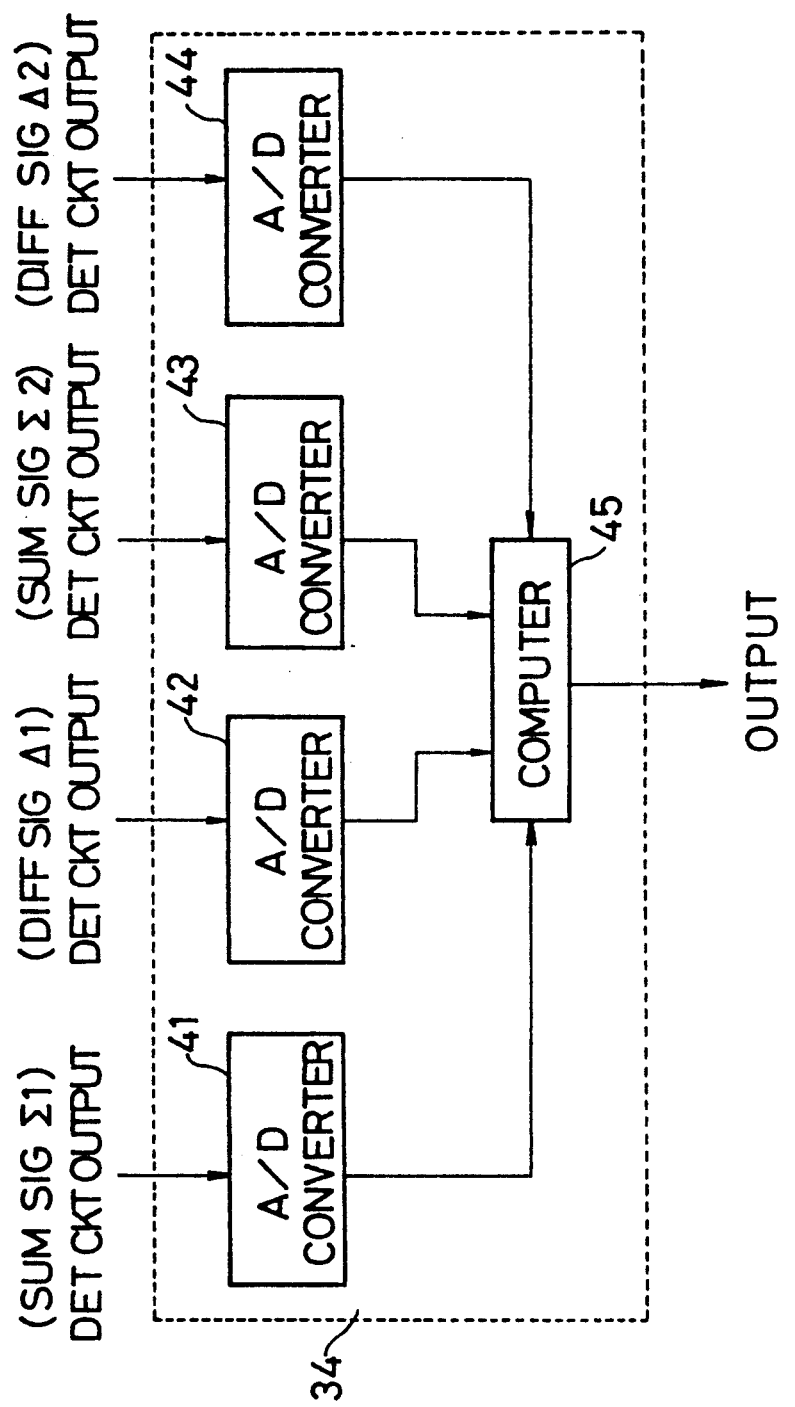
FIG. 12 is a circuit diagram of one embodiment of a signal processing section.

As an example of the embodiment of each antenna system of an antenna apparatus of this embodiment, it is possible to use the same composition as the first embodiment shown in FIG. 8. Generally, differential amplifiers and an adding circuit can be used as a signal processing section when the processing is performed in an analog manner. Moreover, it is possible to use existing techniques such as a means for subtracting and adding with a computer after converting the outputs from the detection circuits into digital signals with A/D converters in the case of digital processing. One embodiment is shown in FIG. 12. In the figure, numerals 41, 42, 43 and 44 are A/D converters for converting the analog sum signal Σ1, the difference signal Δ1, the sum signal Σ2 and the difference signal Δ2 demodulated by the detection circuits into digital signals, respectively. Numerals 45 is a computer which performs the processing of adding a signal resulting from the digital difference signal Δ1 being subtracted from the the sum signal Σ1 to a signal resulting from the difference signal Δ2 being subtracted from the the sum signal Σ2, otherwise outputting zero.

Figure 13:
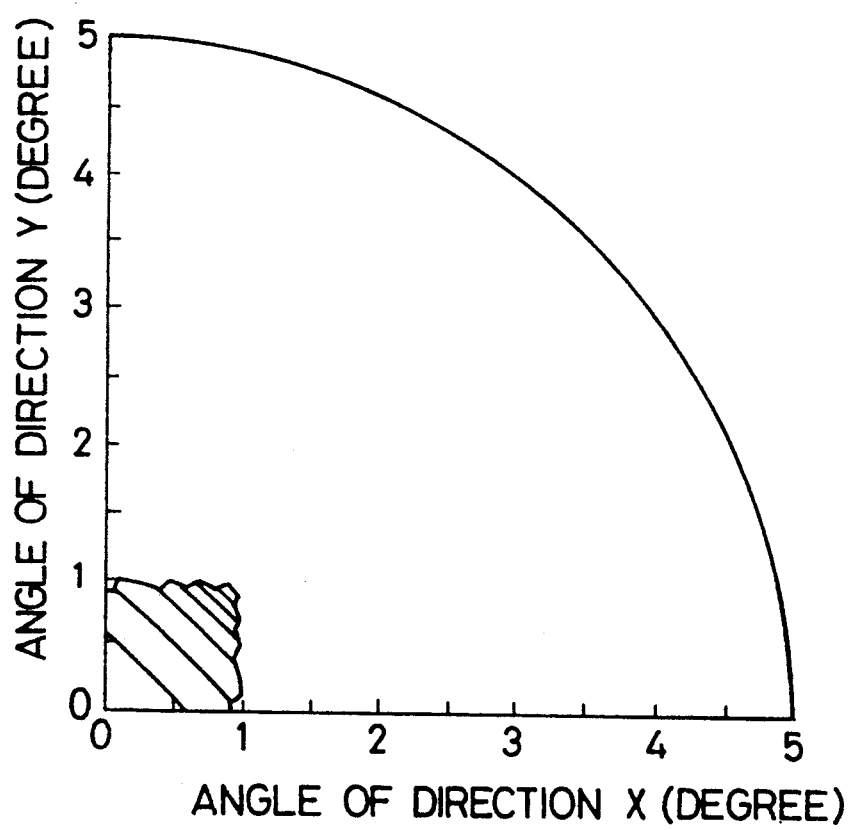
FIG. 13 illustrates a pattern of the output signal in the case of using the deference signals $\Delta 1$, $\Delta 2$ multiplied by a coefficient.

In the second embodiment, using second correction signals multiplying the values of the difference signal Δ1 and the difference signal Δ2, respectively by a coefficient larger than one as a new difference signal Δ1 and difference signal Δ2, and the same processing performed, a beam can be compressed more, and a side lobe can be also reduced. That is, principally, by adopting a larger coefficient for multiplying the difference signal Δ1 and the difference signal Δ2, a beam width can be limitlessly small, and a side lobe can be also limitlessly small. As one embodiment, the result of the simulation is illustrated in FIG. 13 when the correction difference signals set the values of the difference signal Δ1 and the difference signal Δ2 twice are used as a new difference signal Δ1 and a new difference signal Δ2, and the same processing as described is performed. Further, the composition of the antenna system is the same as the simulation illustrated in FIG. 11A and FIG. 11B. FIG. 13 illustrates a pattern performing two-dimensional beam compression and side lobe reduction, with a contour drawing the same as FIG. 11B.

As described hereinbefore, according to the second embodiment, beam width can be reduced two-dimensionally, and a side lobe can be reduced two-dimensionally. Moreover, beam width can be made narrower, and a side lobe can be reduced by setting correction signals multiplying the values of the difference signal Δ1 and the difference signal Δ2, respectively, by a coefficient larger than one as new difference signal Δ1 and difference signal Δ2.

What is claimed is:

1. A method of processing an antenna pattern, having an antenna device consisting of a first antenna system including two similar antennas of a monopulse power feed system placed to correspond with a first direction in relation to a beam width to be compressed, and a second antenna system including two similar antennas of the monopulse power feed system placed to correspond with a second direction lying at a right angle to said first direction, wherein each antenna system shares a central axis, comprising the steps of:

scanning an antenna beam of the antenna device toward a direction other than said first and second directions, adding a signal resulting from a difference signal of the received signals from the two antennas in the first antenna system being subtracted from a sum signal of the signal received from the two antennas in the first antenna system to the signal resulting from a difference signal of the received signals from the two antennas in the second antenna system being subtracted from a sum signal of the received signals from the two antennas in the second antenna system, outputting the added signal as an outputs signal from the antenna device, thereby performing two-dimensional beam compression.

2. A method of processing an antenna pattern having an antenna device consisting of a first antenna system including two similar antennas of a monopulse power feed system placed to correspond with a first direction in relation to a beam width to be compressed, and a second antenna system including two similar antennas of the monopulse power feed system placed to correspond with a second direction lying at a right angle to said first direction, wherein each antenna system shares a central axis, comprising the steps of:

scanning an antenna beam of the antenna device toward a direction other than said first and second directions, adding a signal resulting from a difference signal of the received signals from the two antennas in the first antenna system being subtracted from a sum signal of the received signals from the two antennas in the first antenna system to the signal resulting from a difference signal of the received signals from the two antennas in the second antenna system being subtracted from a sum signal of the received signals from the two antennas in the second antenna system, outputting the added signal as an output signal from the antenna device, and processing to make said output signal zero when the value of the sum signal from said first antenna system is equal to or smaller than the value of the difference signal of said first antenna system, or when the value of the sum signal from said second antenna system is equal to or smaller than the value of the difference signal of said second antenna system, thereby performing two-dimensional beam compression and two-dimensional reduction in a side lobe.

3. A method of processing an antenna pattern having an antenna device consisting of a first antenna system including two similar antennas of a monopulse power feed system placed to correspond with a first direction in relation to a beam width to be compressed, and a second antenna system including two similar antennas of the monopulse power feed system placed to correspond with a second direction lying at a right angle to said first direction, wherein each antenna system shares a central axis comprising the steps of:

scanning an antenna beam of the antenna device toward a direction other than said first and second directions, adding a signal resulting from a difference signal of the received signals from the two antennas in the first antenna system being subtracted from a sum signal of the received signals from the two antennas in the first antenna system to the signal resulting from a difference signal of the received signals from the two antennas in the second antenna system being subtracted from a sum signal of the received signals from the two antennas in the second antenna system, outputting the added signal as an output signal from the antenna device, forming first and second correction difference signals by multiplying each difference signal of said first antenna system and said second antenna system by a coefficient larger than one, and performing two-dimensional beam compression and two-dimensional reduction in a side lobe by setting said output signal to zero when the value of the sum signal from said first antenna system is equal to or smaller than the value of the first correction difference signal or when the value of the sum signal from said second antenna system is equal to or smaller than the value of the second correction difference signal, whenever each said correction difference signal is subtracted from each said sum signal.

* * * * *